United States Patent [19]
Stevens et al.
[11] Patent Number: 4,911,028
[45] Date of Patent: Mar. 27, 1990

[54] APPARATUS AND METHOD FOR CARRYING OUT MEASUREMENTS ON A BOBBIN OF SHEET MATERIAL

[75] Inventors: William H. Stevens, Richmond; Everett C. Grollimund, Midlothian, both of Va.

[73] Assignee: Philip Morris Incorporated, New York, N.Y.

[21] Appl. No.: 308,731

[22] Filed: Feb. 9, 1989

[51] Int. Cl.[4] .............. G01N 15/08
[52] U.S. Cl. .............. 73/866; 73/38
[58] Field of Search .............. 73/866, 38, 865.8, 159, 73/866; 250/562, 572

[56] References Cited

U.S. PATENT DOCUMENTS 4,495,796 1/1985 Hester et al. .............. 73/38

FOREIGN PATENT DOCUMENTS 7177 1/1986 Japan .............. 250/562

*Primary Examiner*—Jerry W. Myracle

[57] ABSTRACT

An apparatus and method for automatically stripping sheet material from a bobbin, measuring characteristics of the material and labelling the bobbin. The apparatus includes a delaminator pick-up device for securing a lamination layer of the material and picking-up the secured portion from the bobbin. A threading device threads the secured portion and contiguous portions of the material through a measurement device. The threaded material is engaged by an engaging device and passed through the measurement device. The measurement device measures characteristics of the material.

23 Claims, 6 Drawing Sheets

APPARATUS AND METHOD FOR CARRYING OUT MEASUREMENTS ON A BOBBIN OF SHEET MATERIAL

BACKGROUND OF THE INVENTION

This invention relates generally to quality control machinery for use in a manufacturing operation and, more particularly, to apparatus and method for stripping sheet material such as paper or film from a bobbin and measuring characteristics of the material.

Many manufacturing operations use large rolls of paper material or the like. Often the quality of the material needs to be checked before the material is used in manufacturing a product. For example, large bobbins of tipping paper are used in the production of cigarettes to attach a filter to the tobacco rod. Frequently, tipping paper contains small perforations to adjust the level of dilution of the cigarette. After the tipping paper has been perforated, e.g., by a laser perforating machine, and prior to production of the cigarettes, the spacing and size of the holes must be checked.

It is desirable to have as much of the quality checking process be automated as possible. By automating the process, speed and accuracy are increased. Additionally, the cost of manufacturing is reduced.

Some manufacturing operations use employees to manually delaminate the bobbin and manually measure the material to check its quality. Such an operation is highly labor intensive. As a result it is time consuming, inefficient and costly.

Other manufacturing operations utilize machinery to perform the quality control checks. However, even these operations require employees to manually feed the material to the measurement machinery, and/or control the operation.

It will be appreciated from the foregoing that a totally automatic bobbin stripping and measuring apparatus is a needed improvement. The present invention fulfills this need.

SUMMARY OF THE INVENTION

The present invention is embodied in a totally automatic bobbin stripping and measuring apparatus and method for automatically delaminating bobbins of sheet material and performing quality measurements on the material. In accordance with the invention, the apparatus includes delaminator pick-up means for securing an outer lamination of the material which is threaded by threading means through measurement means where the quality of the material is measured. The invention further includes first rotating means for rotating the bobbin into a labelling position after the quality measurements are completed and labelling means for labelling the material to seal the bobbin. By performing these operations automatically and eliminating the manual operations, this invention increases the speed and accuracy and decreases the cost of the manufacturing operation.

More particularly, one of many applications for the apparatus involves the use of tipping paper. Tipping paper is paper applied about the filter and a portion of a tobacco rod to attach the filter to the cigarette body. Many cigarette manufacturers perforate the tipping paper to produce small holes which adjust the level of dilution of the cigarette. Typically, the tipping paper is run through a perforating machine, e.g., a laser perforator, and wound onto a bobbin. In accordance with the invention, the apparatus automatically strips an outer lamination of the tipping paper from the bobbin, feeds it through a measuring section where the spacing of the perforations is measured and the porosity of the tipping paper is measured, and seals and labels the bobbin when the tests are concluded.

The delaminator pick-up means includes movement means for moving suction means into a position substantially adjacent to the outer lamination on the bobbin to secure the lamination by suction. Once the lamination is secured by suction, pinch blade means further secures the lamination by clamping. Then, the movement means moves the suction means and pinch blade means away from the bobbin while retaining the secured portion of the lamination.

The apparatus further includes threading means for threading the secured portion of the lamination and contiguous portions thereof through measurement means where characteristics of the tipping paper are measured. The threading means includes contact means which is moved into a position to contact the secured portion between the position of the suction means and pinch blade means and the position of the bobbin. The threading means is further moved through the measurement means to engaging means. Because the secured portion is fixed to the suction means and pinch blade means, the movement of the contact means pulls tipping paper from the bobbin. As the contact means is moved through the measurement means, tipping paper is unwound from the bobbin and a trail through the measurement means is left, thereby threading the measurement means. When the threading means reaches the engaging means, the tipping paper is engaged by the engaging means.

After the tipping paper is engaged, release means breaks the suction and clamping holding the secured portion to the suction means and pinch blade means thereby releasing the secured portion from the delaminator pick-up means. Thereafter, the engaging means causes the tipping paper to pass through the measurement means and the contact means disengages itself from the tipping paper. For a short period, the engaging means pulls a double layer of tipping paper through the measurement means. It becomes a single layer after the secured portion passes through. The quality measuring takes place after the single layer is present.

The measurement means measures both the porosity of the tipping paper and the spacing of the perforations. Of course it is understood that this invention contemplates other measurements being added or substituted for the two which are described in the preferred embodiment. The porosity measurement is performed by porosity measurement means which measures the pressure drop across the tipping paper. The spacing of the perforated holes is determined by visual inspection means. The visual inspection means includes light means for illuminating the tipping paper and camera means for receiving the light passing through the perforated holes. The visual inspection means further includes computation means for computing the distance between the edge of the tipping paper and the first row of holes, the other edge of the tipping paper and the last row of holes, and the distance between each row of holes based upon the light received by the camera means.

The apparatus also seals and labels the bobbin when the quality measuring is completed. To accomplish this, first rotating means are included for rotating the bobbin into a labelling position. The label is applied by labelling means and placed over the end of the tipping paper to seal the bobbin.

BRIEF DESCRIPTION OF THE DRAWINGS

The above and other aspects and advantages of the present invention will become apparent from the following description of the preferred embodiment, taken in conjunction with the accompanying drawings, in which like reference characters refer to like parts throughout, and in which.

DESCRIPTION OF THE PREFERRED EMBODIMENT

Figure 1:
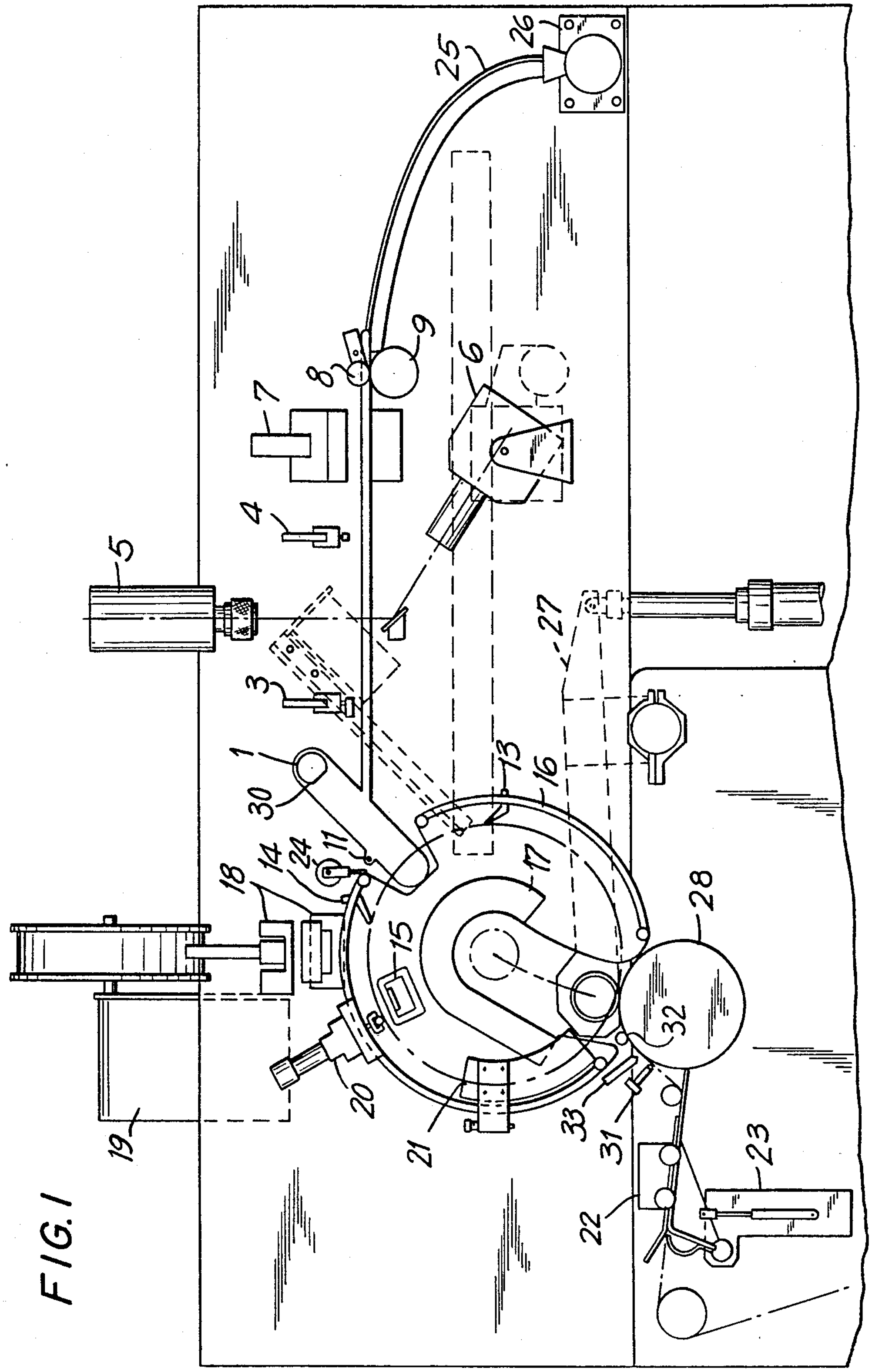
FIG. 1 is a side elevational view of the apparatus of the invention showing perforated tipping paper being wound around the bobbin core.

Referring to the drawings, there is shown an automatic bobbin stripping and measuring apparatus loaded with a bobbin of tipping paper. The bobbin is loaded by paper guides 22, 23, glue gun 31, bobbin spindle arm 27, and drive drum 28 which act in combination to guide the tipping paper onto the bobbin core and wind it around the bobbin core. A delaminator pick-up head 1 strips an outer lamnation which is then threaded through a measurement section by a paper transfer rod 11. The measurement section includes a redicon camera 5 and light source 6 for measuring hole locations in the tipping paper and a porosity checking head 7 for measuring the pressure drop through the holes. The redicon camerea has a field of vision of 2,048 pixels. After the measurements have been completed, a bobbin repositioning drive 15 rotates the bobbin into a labelling position where a label applicator head 18 applies a label which seals the bobbin.

In accordance with the invention, the apparatus performs the herein described operations automatically. It receives perforated tipping paper, performs quality checks on the paper and produces a sealed bobbin of tipping paper ready for cigarette manufacturing. By automating these operations, the speed and accuracy of cigarette manufacturing is increased and the cost is decreased.

More particularly, and with reference to FIG. 1, tipping paper with laser perforated holes travels along a feed path to the bobbin core. The paper is guided along this path by a retractable lower paper guide 23, an upper paper guide 22, and a diamond impregnated drive drum 28. The bobbin core is mounted on a bobbin spindle arm 27. The spindle arm is biased to hold the core of the bobbin substantially adjacent to the drive drum when the bobbin is empty. As tipping paper begins to be fed to the empty bobbin core, a glue gun 31 applies a small amount of glue to the tipping paper near its leading end. As a result, when the tipping paper reaches the bobbin core, it adheres to the core. The rotation of the drive drum feeds tipping paper to the core and causes the bobbin core to rotate. Once the tipping paper adheres to the bobbin core, further rotation of the drive drum causes tipping paper to be wound around the rotating bobbin core. The bobbin spindle arm, which is spring loaded, moves away from the drive drum as the number of laminations around the core increases. However, the biasing of the bobbin spindle arm keeps the outer lamination in contact with the drive drum. Accordingly, the rotation of the drive drum continues to rotate the bobbin core and wind tipping paper around it.

In the event that the leading portion of the tipping paper being fed to the bobbin core is not perforated, it is desire able that the non-perforated paper be sealed to the bobbin core so that it is not used in the manufacturing operation. The apparatus includes a spot glue gun 32 and ink gun 33 disposed alongside the feed path. A short time after the non-perforated paper has passed the spot glue gun, the spot glue gun applies glue to the paper. Thus, the earlier paper is sealed to the bobbin core and unavailable for use when the bobbin is later unwound during manufacturing. Similarly, the ink gun applies ink after the non-perforated paper has passed marking the border of usable tipping paper.

Figure 2:
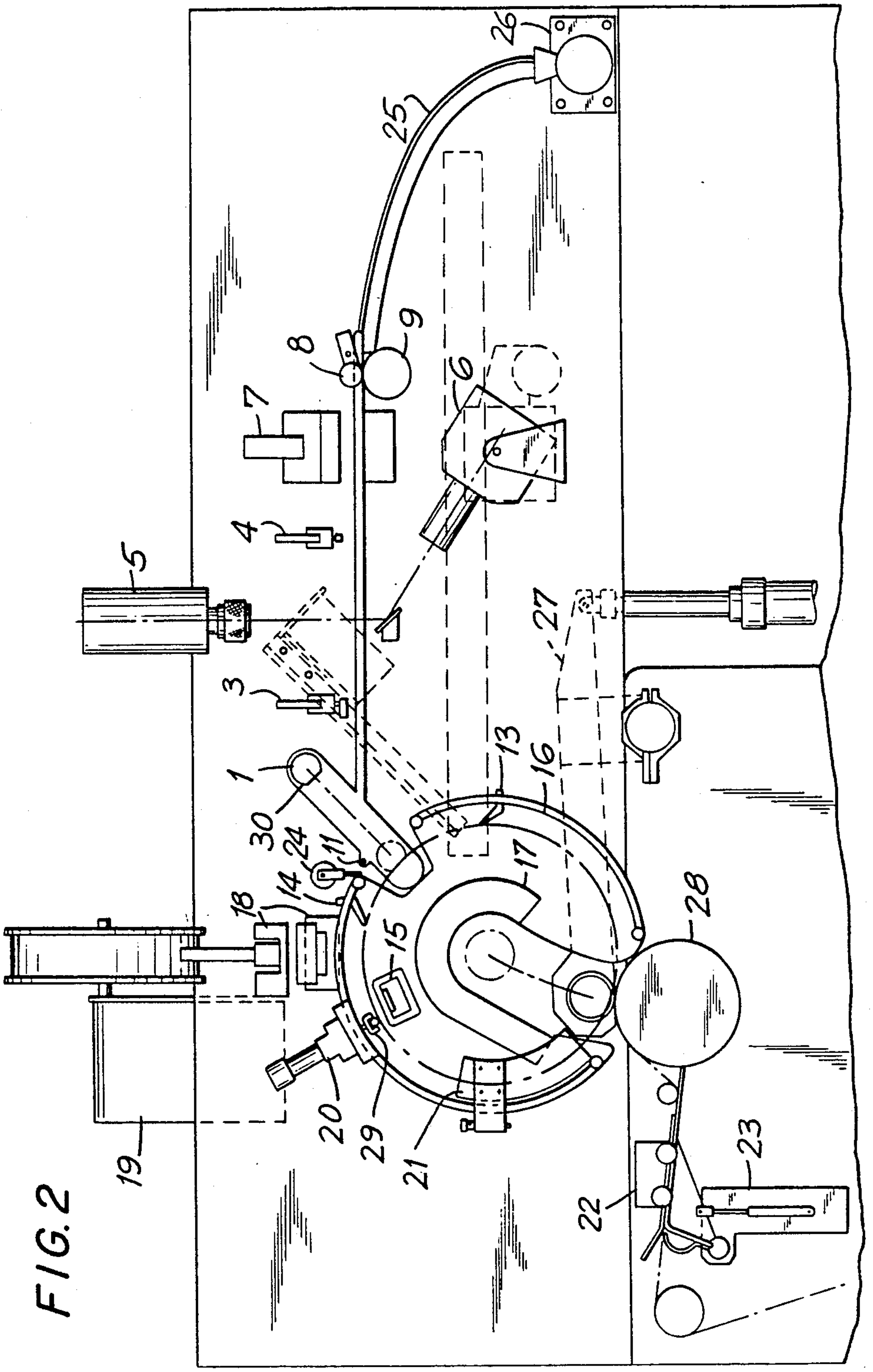
FIG. 2 is a side elevational view of the apparatus of the invention showing a fill bobbin with the bobbin spindle arm in a down position, bobbin tension break applied, and delaminator pick-up head in the paper pick-up position.

Referring now to FIG. 2, after all the tipping paper has been wound around the bobbin core, the drive drum 28 is disengaged from the tipping paper. Additionally, a bobbin tension break 29 is extended from a two shaft cylinder 20 to contact the tipping paper and slow the rotation of the bobbin core. During the period of deceleration, a plexiglas shroud 16 contains the loose end of the bobbin paper. Additionally, a retaining shield 21 retains the tipping paper and an air jet 13 blows air at the outer lamination to hold it to the bobbin core.

After the bobbin core is fully wound, a bobbin repositioning drive 15 rotates the bobbin core into position for the delaminator pick-up head 1. Then, the delaminator head is moved to a position substantially adjacent to the outer lamination. The delaminator head secures the lamination by suction. Of course, it is understood that the delaminator head may secure the outer lamination by means other than suction, e.g., adhesives. To obtain a good suction grip the delaminator head must contact a continuous strip of the tipping paper—not an end.

Figure 3:
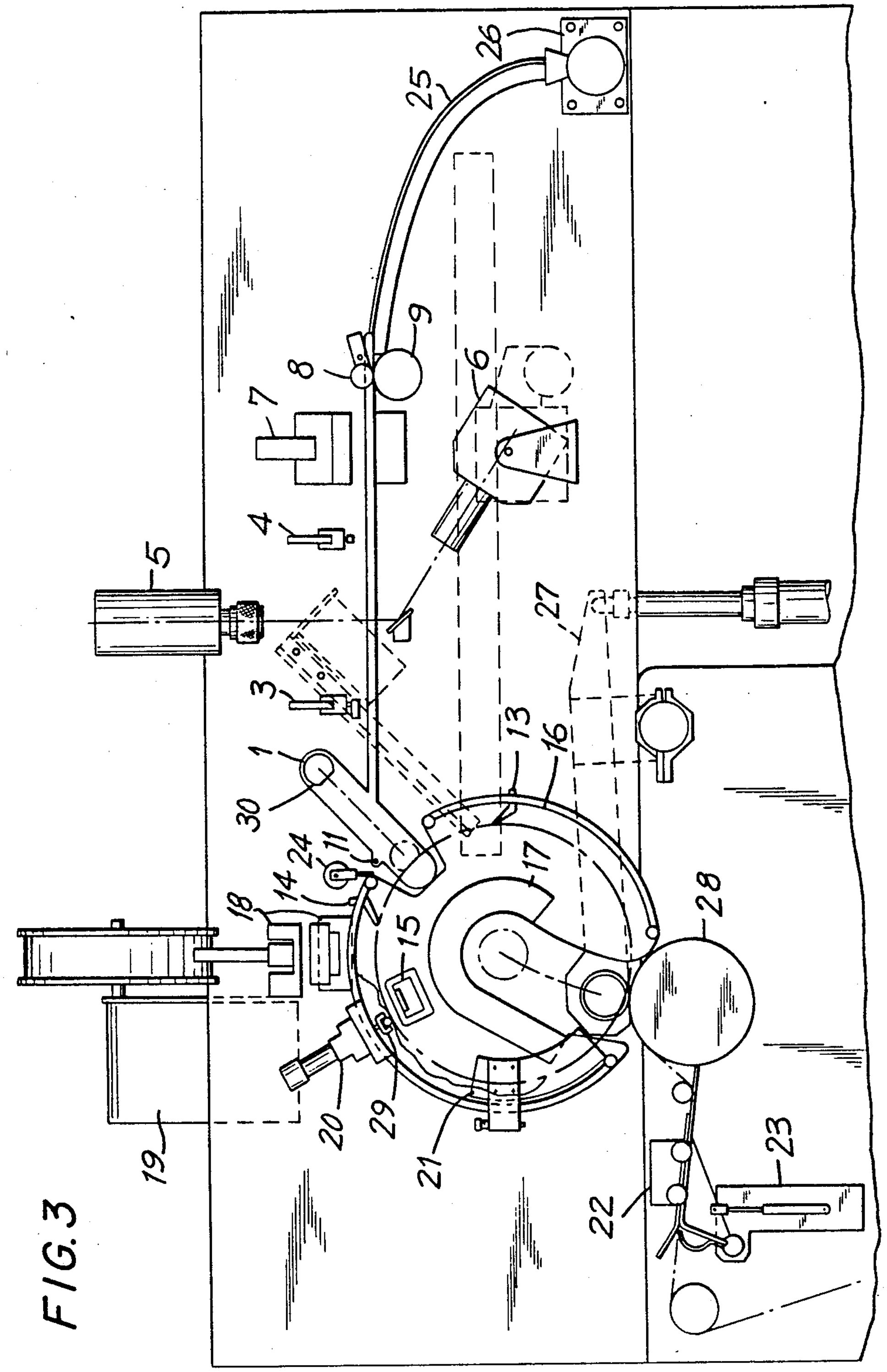
FIG. 3 is a side elevational view of the apparatus of the invention showing paper "blowback"

The bobbin core is rotated by the bobbin repositioning drive 15 to insure that the delaminator pick-up head 1 contacts a continuous strip of tipping paper. An air jet 14 is disposed on the plexaglass shroud 16 near the delaminator head with its nozzle pointed in a counter-clockwise direction. The bobbin repositioning drive rotates the bobbin core in a clockwise direction. The distance of rotation is slightly greater than the distance between the air jet 14 and the position where the dllaminator head contacts the outer lamination. Air jet 14 blows air in a counter-clockwise direction. If the end of the tipping paper is near air jet 14, the jet blows the end of the paper back (paper "blowback") as shown in FIG. 3, thereby keeping the end room being rotated past the jet as the bobbin core is rotated clockwise.

Therefore, if the end of the tipping paper prior to rotation is at the point of contact or between the air jet 14 and the point of contact, it is rotated safely beyond the point of contact, and if the end is in a position such that the rotation would place it in the contact position, the air jet 14 prevents it being rotated there.

After the outer lamination is secured by suction, the delaminator pinch blade 30 further secures the lamination to the delaminator pick-up head 1. The delaminator pinch blade clamps the lamination to the delaminator head.

Figure 4:
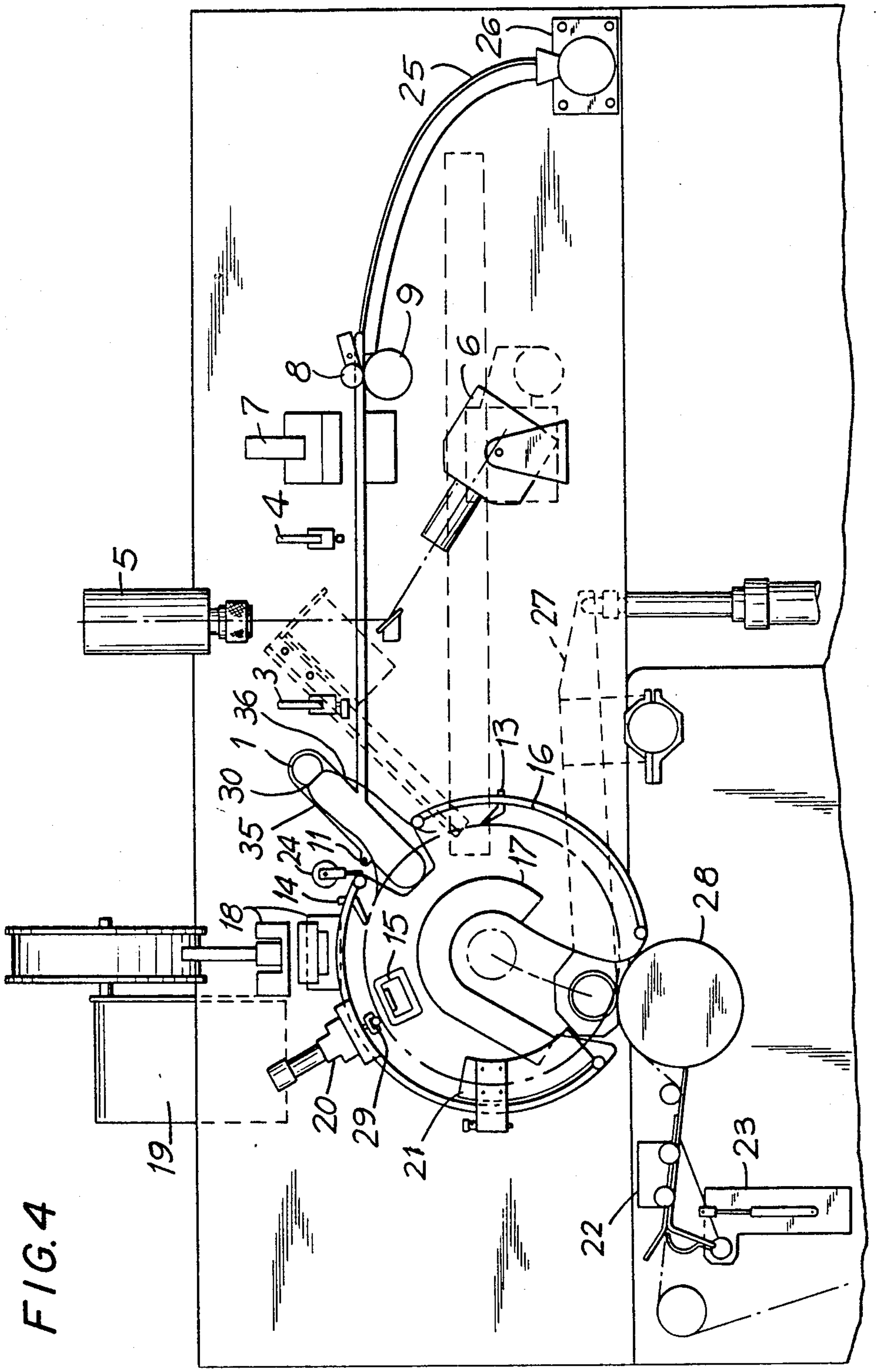
FIG. 4 is side elevational view of the apparatus of the invention showing a lamination secured to the delaminator pick-up head which is in the up position.

Referring to FIG. 4, the delaminator pickup head 1 completes the delamination operation by lifting away from the bobbin holding a secured portion of the outer lamination 35 and a loose hanging end 36. The outer lamination running from the bobbin core to the delaminator head is the secured portion 35. The loose hanging end 36 is the portion of the outer lamination running from the delaminator head to the end of the tipping paper.

After the outer lamination has been stripped, as described above, a paper transfer rod 11 is moved into contact with the secured portion 35 of the tipping paper to thread it through the measurement section. The paper transfer rod is a moveable elongated rod disposed outside the bobbin and on the opposite side of the secured portion from the measurement section. As the transfer rod is moved towards the measurement section, it contacts the secured portion between the delaminator pick-up head 1 and the bobbin core. Because the secured portion is fixed to the delaminator head, continued movment of the transfer rod pulls tipping paper from the bobbin core. As the transfer rod is moved through the measurement section, tipping paper is unwound from the bobbin core and a trail through the measurement section is left, thereby threading the measurement section.

Figure 5:
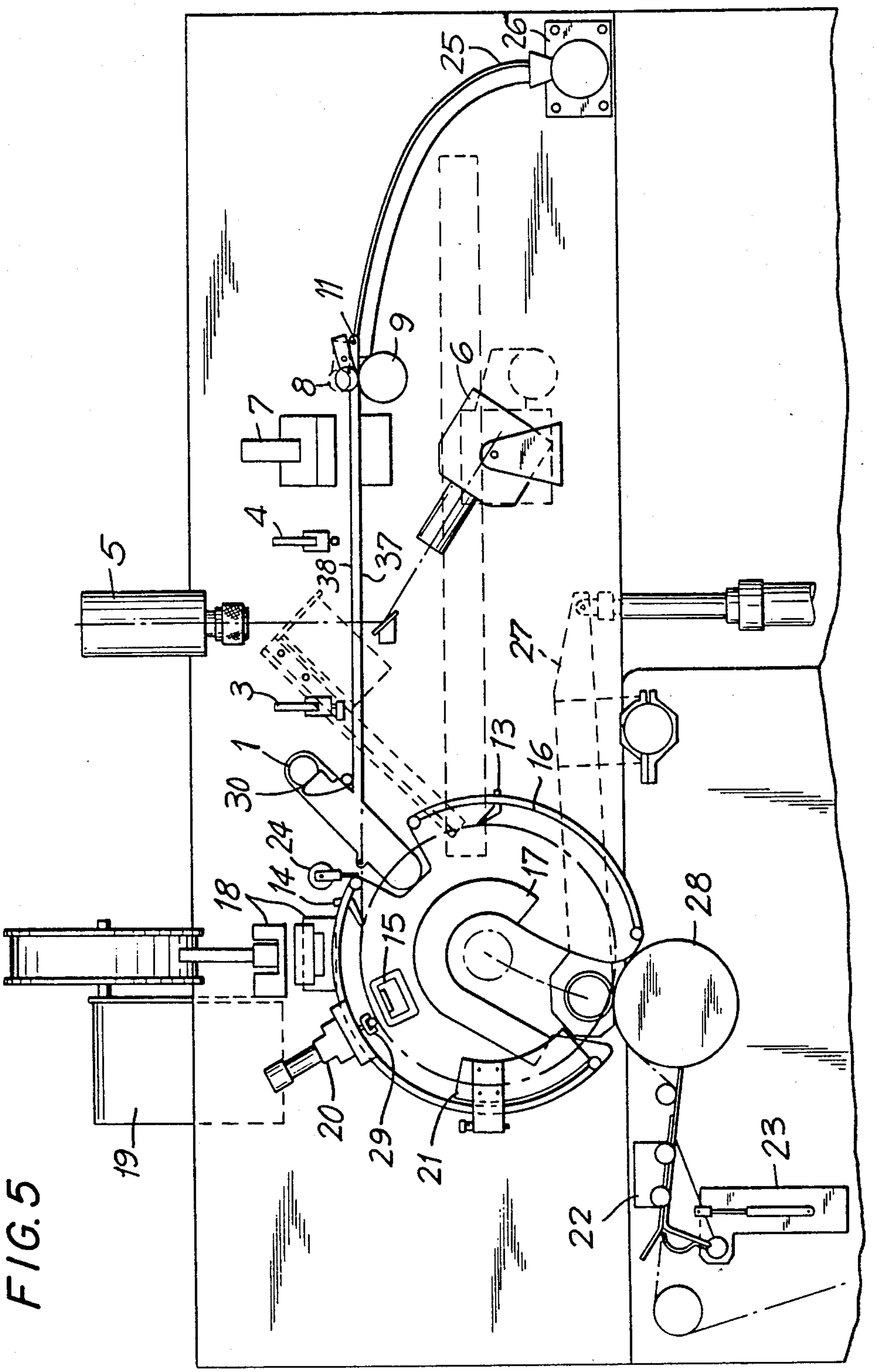
FIG. 5 is a side elevational view of the apparatus of the invention showing the paper transfer rod having threaded the tipping paper through the measuring section and pull rolls.

FIG. 5 shows the transfer rod extended past the measurement section and beyond nib roll 8 and pull roll 9. As can be seen from the figure the secured portion of the outer lamination is held by the delaminator pick-up head 1 and the transfer rod 11 has pulled tipping paper from the bobbin and threaded it through the measurement section to rolls 8, 9. Nib roll 8, whose normal position is in contact with pull roll 9, rotates away from pull roll 9 to permit the transfer rod to pass between rolls 8, 9. After the transfer rod passes, nib roll 8 retracts and the tipping paper is engaged between rolls 8, 9.

At this point, a double layer of tipping paper is threaded through the measurement section and rolls 8, 9. The first layer 37 runs from the bobbin core and the second layer 38 includes the secured portion.

After rolls 8, 9 engage the tipping paper, the secured portion is released from the delaminator pick-up head 1. Both the suction and the clamp which holds the secured portion to the delaminator head are disengaged. Thereafter, rolls 8, 9 begin to turn and the rotation of the rolls pulls paper from the bobbin core through the measurement section. At first, both layers are pulled though the measurement section. After all of the second layer is pulled through the measurement section, only the first layer of tipping paper remains.

Approximately 25 feet of tipping paper is stripped from the bobbin core. The last five feet of paper is used for the quality control measurements. This insures that quality perforated paper is inspected. After 25 feet of paper has been stripped, a paper cut knife 24, disposed between the bobbin core and the measurement section, cuts the tipping paper separating the paper wound on the bobbin core from the paper travelling through the measurement section.

Figure 6:
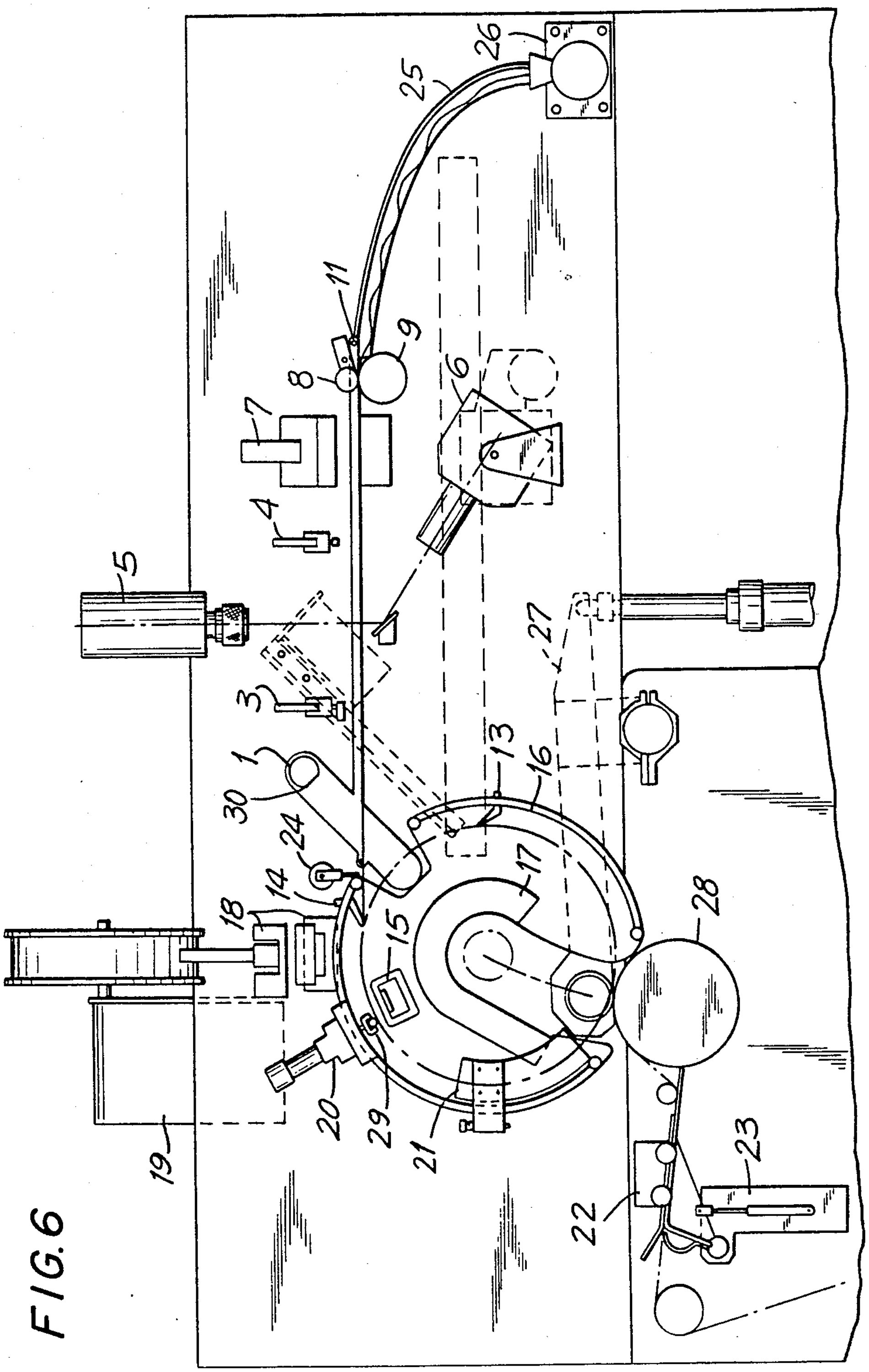
FIG. 6 is a side elevational view of the apparatus of the invention showing a single layer of the tipping paper passing through the measuring section and into the paper chopper.

With a single layer of tiping paper threaded through the measurement section, as shown in FIG. 6, the apparatus is ready to measure the tipping paper. A redicon camera 5 is in a fixed position within the measurement section where it can view the full width of the tipping paper as the tipping paper passes the camera. On the other side of the tipping paper, a light source 6 is placed in position to illuminate the perforated holes in the tipping paper. Either by direct placement of the light source or by using a mirror, light from the light source passing through the holes is received by the camera. Electrical signals correlating to the light received by the camera are transmitted to a cell controller (not shown). The cell controller determines the distance from an edge of the tipping paper to the first row of holes, the first row of holes to the second row of holes, the second row of holes to the third row of holes, the third row of holes to the fourth row of holes, and the fourth row of holes to the other edge of the tipping paper. If these distances are not within a pre-determined range, the apparatus rejects the roll of tipping paper.

A first paper tensioner 3 and second paper tensioner 4 are placed on opposite sides of the camera 5. The first paper tensioner is stationed on the bobbin side of the camera. Their function is to keep the tipping paper taut while the distances are being measured. Additionally the first paper tensioner includes a vacuum pick-up to remove dust from the paper before it is measured. These devices act to increase the accuracy of the measurements.

The apparatus also measures the porosity of the paper. A porosity checking head 7 is disposed in fixed position within the measurement section and after the camera. Of course, it is understood that the order of the camera and the porosity checking head can be reversed. The porosity checking head measures the pressure drop across the tipping paper. The pressure drop is measured a number of times, e.g., 5 separate times. The cell controller (not shown) averages the results and, if the measurements are not within a predetermine range, the tipping paper is rejected.

It is understood that other measuring devices could be added to or substituted for those just described. After the tipping paper passes through the measurement section and rolls 8, 9, it is transported through an air chute 25. The air chute directs the paper to a paper chopper 26. The paper chopper cuts the paper into short strips for disposal. By cutting the paper into short strips, the paper can be more tightly packed and consequently, more easily disposed of.

After the quality measurements have been completed, the paper in the measurement section continues to be pulled towards the paper chopper 26 until none remains. Now the bobbin is ready to be labelled and sealed and the paper transfer rod 11 retracts to its original position near the bobbin.

A bobbin repositioning drive 15 rotates the bobbin counter-clockwise a prescribed distance so that the end of the tipping paper is aligned with a label applicator head 18. A label is fed from a label feed and stripping unit 19 to the label applicator head for application. The label is applied over the end of the tipping paper, thereby sealing the bobbin. The label unit includes a microprocessor. The microprocessor enables information relating to the bobbin, e.g., product code, bobbin number, measurement results, machine number and date to be printed on the label by the label feed unit.

After the bobbin is labelled, a bobbin transfer pusher 17 disposed along a side of the bobbin pushes the bobbin off the axis that the bobbin core revolved on. The bobbin is transferred to a waiting robot. The robot places the bobbin on either a finished product pallet or reject pallet.

A machine controller, e.g., Gould 884 programmable controller, and the cell controller in combination control the timing and operation of the functions of the apparatus described herein.

As can be seen from the foregoing, the apparatus is completely automatic. The tipping paper is automatically loaded onto a bobbin core, an outer lamination is stripped and threaded through a measurement section where quality measurements are performed and when the measurements have been completed, the bobbin is sealed with a label and discharge from the apparatus to a waiting robot.

The preferred embodiment has been described with reference to a single path machine. This invention also contemplates an automatic bobbin stripping and measuring apparatus that runs two or more paths of tipping paper simultaneously.

Although the invention has been described in detail with reference to its presently preferred embodiment, it will be understood by one of ordinary skill in the art that various modifications can be made without departing from the spirit and scope of the invention. Accordingly, it is not intended that the invention be limited, except by the appended claims.

We claim:

1. An apparatus for automatically stripping sheet material from a bobbin, measuring characteristics of the material and labelling the bobbin comprising:

delaminator pick-up means for securing a lamination layer of the material and picking-up the secured portion from the bobbin;

measurement means for measuring characteristics of the material;

threading means for threading the secured portion and contiguous portions of the material through the measurement means; and engaging means for engaging the threaded material and causing the material to pass through the measurement means.

2. The apparatus of claim 1, wherein the apparatus further includes release means for releasing the secured portion from the delaminator pick-up means.

3. The apparatus of claim 1, wherein the apparatus further includes a bobbin having the material wound around its core.

4. The apparatus of claim 3, wherein the apparatus further includes load means for winding the material around the bobbin core.

5. The apparatus of claim 1, wherein the measurement means includes porosity measurement means for measuring the pressure drop across the material.

6. The apparatus of claim 1, wherein the measurement means includes visual inspection means for measuring spacing of perforated holes in the material.

7. The apparatus of claim 6, wherein the visual inspection means includes:

light means for illuminating the material;

camera means for receiving light passing through the perforated holes; and computation means for computing the spacing of the perforated holes based on the light received by the camera means.

8. The apparatus of claim 1, wherein the delaminator pick-up means includes suction means for securing a lamination layer of the material by suction.

9. The apparatus of claim 1, wherein the delaminator pick-up means includes pinch blade means for securing a lamination layer of the material by clamping.

10. The apparatus of claim 1, wherein the delaminator pick-up means includes movement means for moving the delaminator pick-up means towards the bobbin to secure the lamination layer and for moving the delaminator pick-up means with the secured portion away from the bobbin.

11. The apparatus of claim 1, wherein the threading means includes contact means for contacting the secured portion between the delaminator pick-up means and the bobbin and moving through the measurement means to the engaging means, thereby pulling material from the bobbin and leaving a trail of the material through the measurement means which threads the measurement means.

12. The apparatus of claim 1, wherein the apparatus further includes:

first rotating means for rotating the bobbin into a labelling position; and labelling means for labelling the material when the bobbin is in the labelling position.

13. The apparatus of claim 1, wherein the apprratus further includes:

second rotating means for rotating the bobbin a specified distance in a first direction; and blower means, located a distance from the position where the delaminator pick-up means secures a lamination layer which is less than the specified distance, for expelling a fluid in a direction opposite the first direction, thereby preventing an end of the material from being rotated by the second rotating means past the blower means.

14. An apparatus for automatically stripping sheet material from a bobbin, measuring characteristics of the material and labelling the bobbin comprising:

delaminator pick-up means for securing a lamination layer of the material and picking-up the secured portion from the bobbin;

movement means for moving the delaminator pick-up means towards the bobbin to secure the lamination layer and for moving the delaminator pick-up means with the secured portion away from the bobbin;

second rotating means for rotating the bobbin a specified distance in a first direction;

blower means, located a distance from the position where the delaminator pick-up means secures a lamination layer which is less than the specified distance, for expelling a fluid in a direction opposite the first direction, thereby preventing an and of the material from being rotated by the second rotating means past the blower means;

measurement means for measuring characteristics of the material;

threading means including contact means for contacting the secured portion between the delaminator pick-up means and the bobbin and moving through the measurement means to the engaging means, thereby pulling material from the bobbin and leaving a trail of the material through the measurement means which threads the measurement means; and engaging means for engaging the threaded material and causing the material to pass through the measurement means.

15. A method for automatically stripping sheet material from a bobbin, measuring characteristics of the material and labelling the bobbin comprising the steps of:

securing with delaminator pick-up means a lamination lair of the material and picking-up the secured portion of the material from the bobbin;

threading the secured portion and contiguous portions of the material through measurement means;

engaging the threaded material and causing the material to pass through the measurement means; and measuring characteristics of the material with the measurement means.

16. The method of claim 15, wherein the method includes the additional step of winding the material around the bobbin core.

17. The method of claim 15, wherein the measuring step includes measuring the pressure drop across the material.

18. The method of claim 15, wherein the measuring step includes:

illuminating the material;

receiving light passing through perforated holes in the material; and computing the spacing of the perforated holes based on the light received by camera means.

19. The method of claim 15, wherein the securing step includes securing a lamination layer of the material by suction.

20. The method of claim 15, wherein the securing step includes securing a lamination layer of the material by clamping.

21. The method of claim 15, wherein the threading step includes contacting the secured portion with contact means between the delaminator pick-up means and the bobbin and moving the contact means through the measurement means, thereby pulling material from the bobbin and leaving a trail of the material through the measurement means which threads the measurement means.

22. The method of claim 15, wherein the method includes the additional steps of:

rotating the bobbin with second rotating means a specified distance in a first direction; and expelling a fluid from blower means in a direction opposite the first direction, thereby preventing an end of the material from being rotated by the second rotating means past the blower means.

23. A method for automatically stripping sheet material from a bobbin, measuring characteristics of the material and labelling the bobbin comprising the steps of:

rotating the bobbin with second rotating means a specified distance in a first direction;

expelling a fluid from blower means in a direction opposite the first direction, thereby preventing an end of the material from being rotated by the second rotating means past the blower means;

securing with delaminator pick-up means a lamination layer of the material and picking-up the secured portion of the material from the bobbin;

threading the secured portion and contiguous portions of the material through measurement means including contacting the secured portion with contact means between the delaminator pick-up means and the bobbin and moving the contact means through the measurement means, thereby pulling material from the bobbin and leaving a trail of the material through the measurement means which threads the measurement means;

engaging the threaded material and causing the material to pass through the measurement means; and measuring characteristics of the material with the measurement means.

* * * * *

UNITED STATES PATENT AND TRADEMARK OFFICE
CERTIFICATE OF CORRECTION

PATENT NO. : 4,911,028
DATED : March 27, 1990
INVENTOR(S) : William H. Stevens et al.

It is certified that error appears in the above-identified patent and that said Letters Patent is hereby corrected as shown below:

Column 3, line 19, "fill" should be -- full --; and line 46, "lamnation" should be -- lamination --.

Column 4, line 63, "dllaminator" should be -- delaminator --; and line 67, "room" should be -- from --.

Column 5, line 32, "movment" should be -- movement --.

Claim 13, column 8, line 30, "apprratus" should be -- apparatus --.

Claim 14, column 8, line 59, "and" should be -- end --.

Signed and Sealed this

Fifth Day of October, 1993

*Attest:*

BRUCE LEHMAN

*Attesting Officer*

*Commissioner of Patents and Trademarks*